United States Patent [19]

Lasich

[11] Patent Number: 5,261,390
[45] Date of Patent: Nov. 16, 1993

[54] SYSTEM FOR HEATING FLUID IN PROCESS EQUIPMENT WITH SOLAR ENERGY

[76] Inventor: John B. Lasich, 168 Ridge Rd., Mt. Dandenong, Australia, 3767

[21] Appl. No.: 671,864

[22] PCT Filed: Oct. 3, 1989

[86] PCT No.: PCT/AU89/00424

§ 371 Date: Apr. 1, 1991

§ 102(e) Date: Apr. 1, 1991

[87] PCT Pub. No.: WO90/04143

PCT Pub. Date: Apr. 19, 1990

[30] Foreign Application Priority Data

Oct. 3, 1988 [AU] Australia .................. PJ0715

[51] Int. Cl.⁵ .................................. F24J 3/02
[52] U.S. Cl. ............................ 126/638; 126/643; 126/652; 126/704; 126/714
[58] Field of Search ............ 126/442, 440, 433, 417, 126/638, 643, 652, 704, 714

[56] References Cited

U.S. PATENT DOCUMENTS

| | | | |
|---|---|---|---|
| 3,869,199 | 3/1975 | Cummings . | |
| 4,010,732 | 3/1977 | Sawata et al. | 126/440 X |
| 4,015,582 | 4/1977 | Liu et al. . | |
| 4,022,187 | 5/1977 | Roberts . | |
| 4,119,085 | 10/1978 | Knowles et al. | 126/433 |
| 4,144,873 | 3/1979 | Blanton | 126/440 |
| 4,228,789 | 10/1980 | Kay . | |
| 4,249,083 | 2/1981 | Bitterly . | |
| 4,261,336 | 4/1981 | Uroshevich . | |
| 4,382,437 | 5/1983 | Woods et al. | 126/433 |
| 4,440,151 | 4/1984 | Yamamoto et al. | 126/433 |
| 4,505,260 | 3/1985 | Metzger | 126/400 X |
| 4,628,904 | 12/1986 | Clegg . | |
| 4,905,665 | 3/1990 | Geyer et al. | 126/440 X |

FOREIGN PATENT DOCUMENTS

| | | |
|---|---|---|
| 12191/76 | 9/1977 | Australia . |
| 77708/81 | 5/1983 | Australia . |
| 14749/83 | 12/1983 | Australia . |
| 15217/88 | 11/1989 | Australia . |
| 385590 | 4/1988 | Austria . |
| 7915515 | 4/1980 | France . |
| 57-134660 | 8/1982 | Japan . |
| 86/01790 | 4/1985 | PCT Int'l Appl. . |
| 86/07627 | 12/1986 | PCT Int'l Appl. . |
| 553865 | 11/1977 | U.S.S.R. . |
| 981710 | 4/1982 | U.S.S.R. . |
| 2033572 | 5/1980 | United Kingdom . |

*Primary Examiner*—Larry Jones
*Attorney, Agent, or Firm*—Merchant, Gould, Smith, Edell, Welter & Schmidt

[57] ABSTRACT

A system for heating a fluid (5) conveyed or contained in process equipment (7) comprises a layer of transparent thermal insulation (9) which partly covers the process equipment so that a section (13) is exposed to solar radiation and thus is heated by the solar radiation and thereby heats the fluid (5). The "window" defines a form of thermal diode concentrator in that the surface area of the "window" is great than that of the exposed section (13) of the process equipment (7) and thus the "window" in effect concentrates the solar radiation onto the exposed section (13) of the process equipment, and the transparent thermal insulation (9), albeit transparent, minimises heat loss from the fluid (5).

22 Claims, 3 Drawing Sheets

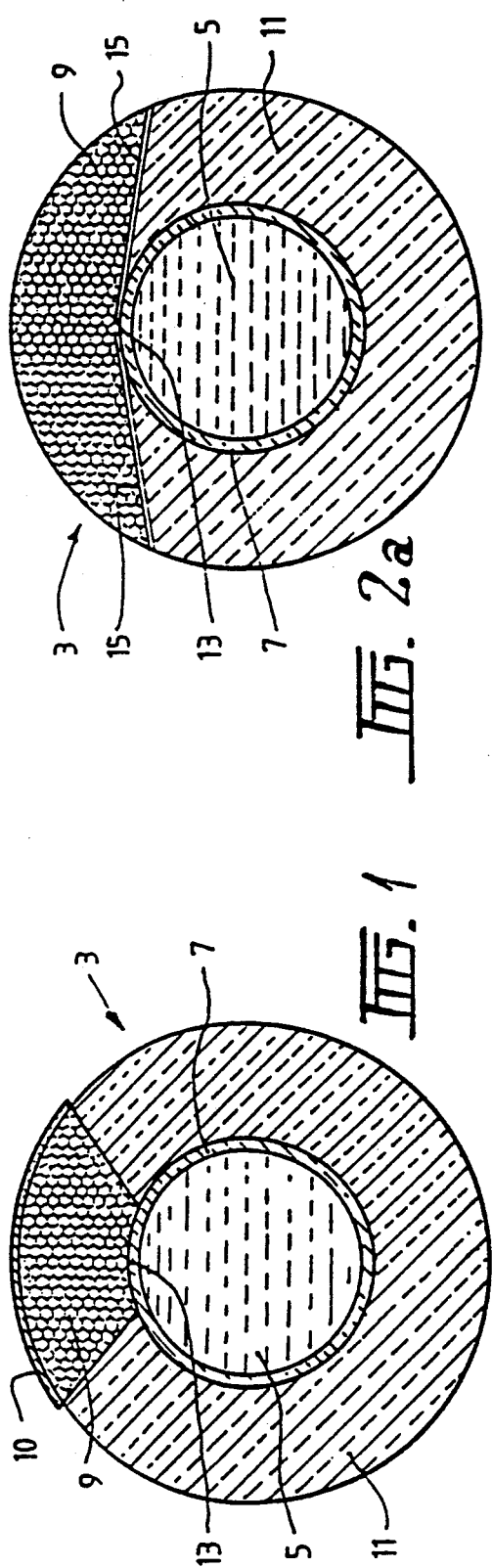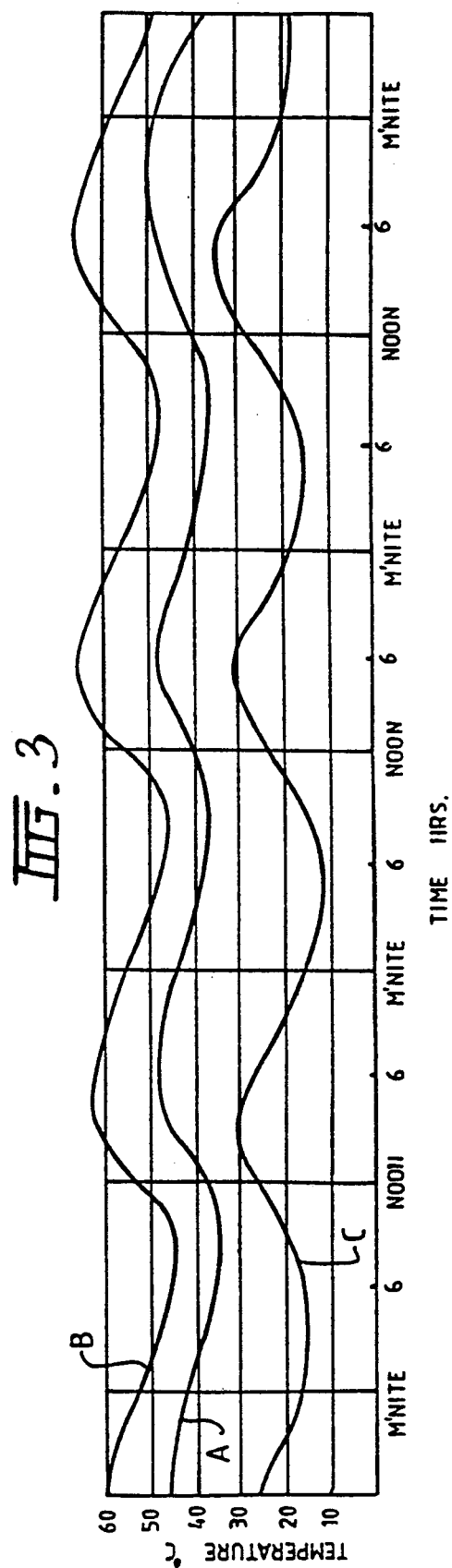

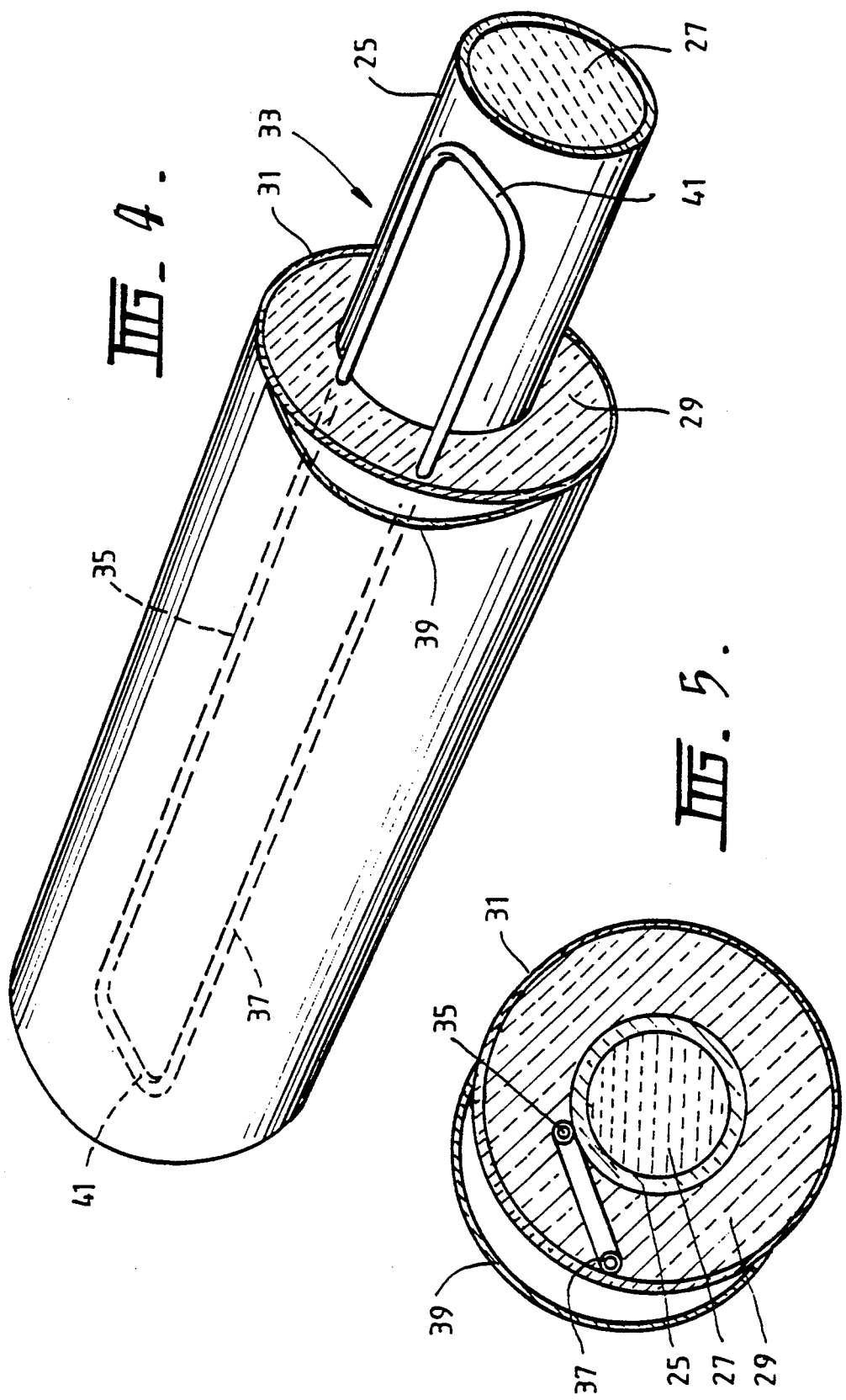

SYSTEM FOR HEATING FLUID IN PROCESS EQUIPMENT WITH SOLAR ENERGY

FIELD OF THE INVENTION

The present invention relates to a system for heating by solar energy a fluid conveyed or contained in process equipment.

The term "process equipment" as described herein is understood to mean pipes, tanks, pumps and the like used in industry to convey or contain fluids. The invention is concerned principally, although by no means exclusively, with fluids which must be maintained at temperatures in excess of ambient. Such fluids include fuel oil, palm oil, and crude oil.

BACKGROUND OF THE INVENTION

Conventional systems for heating fluids in process equipment are based on electric heating and steam heating. It is important that the heating equipment is of a high reliability since failure of the heating equipment would have significant adverse effects on the process equipment. As a consequence, invariably the initial purchase price and on-going maintenance costs of the conventional systems are high.

SUMMARY OF THE INVENTION

It is an object of the present invention to provide an alternative to the above conventional systems.

According to the present invention there is provided a system for heating a fluid conveyed or contained in process equipment, the system comprising:

(a) thermal insulation covering the process equipment to minimise heat loss from the fluid; and (b) a thermal concentrator/diode in heat transfer relationship with the fluid for transferring energy from solar radiation to the fluid thereby to heat the fluid and for minimising heat loss from the fluid.

It is preferred that the thermal insulation comprises, transparent insulation covering a section of the process equipment thereby to expose the section to solar radiation and to define the thermal concentrator/diode, and non-transparent thermal insulation covering the remainder of the process equipment.

It is preferred that the interface between the transparent and non-transparent insulation is inclined downwardly from the exposed section of the process equipment.

With such an arrangement, the thermal concentrator/diode further comprises an air gap at the interface between the transparent and non-transparent thermal insulation. In an alternative arrangement, the thermal concentrator/diode further comprises a partially evacuated stainless steel or the like plate with a volume of water or other fluid. In a further alternative arrangement, the thermal concentrator/diode further comprises a plate formed from polycarbonate or the like having passages therein, the plate extending outwardly from the exposed surface of the process equipment but terminating short of the exposed outer surfaces of the transparent and non-transparent thermal insulations.

It is preferred that the transparent insulation comprises plastic air cell insulating material or entrapped gases with low thermal conductivity.

Typically, the system further comprises a transparent weather shield over the exposed outer surface of the transparent insulation. Such a weather shield may be formed from U.V. stabilised polycarbonate.

Typically, the non-transparent thermal insulation is formed from polyurethane.

In an alternate arrangement it is preferred that the thermal insulation comprises non-transparent insulation at least substantially covering the process equipment, and the thermal concentrator/diode comprises a first part for absorbing energy from solar radiation and a second part in heat transfer relationship with the process equipment for transferring the energy to the fluid.

According to the present invention there is also provided a thermal concentrator/diode for heating a fluid conveyed or contained in process equipment having an outer layer of insulation, said thermal concentrator/diode comprising a first part for absorbing energy from solar radiation and a second part coupled to the first part and adapted for location in heat transfer relationship with the process equipment to transfer the energy to the fluid.

BRIEF DESCRIPTION OF THE DRAWINGS

The present invention is now described in more detail with reference to the accompanying drawings, in which:

FIG. 1 is a transverse section through a first embodiment of the heating system of the invention positioned around a pipe;

FIGS. 2a, 2b, and 2c are transverse sections through preferred forms of a second embodiment of the heating system of the invention positioned around a pipe;

FIG. 3 is a graph of temperature versus time of fluid in pipes covered by the embodiments of the heating system of the invention shown in FIGS. 1 and 2;

FIG. 4 is a partly cut-away perspective view of a third embodiment of the heating system of the invention positioned around a pipe; and FIG. 5 is a transverse section through the arrangement shown in FIG. 4.

DETAILED DESCRIPTION OF THE INVENTION

Figure 2B:
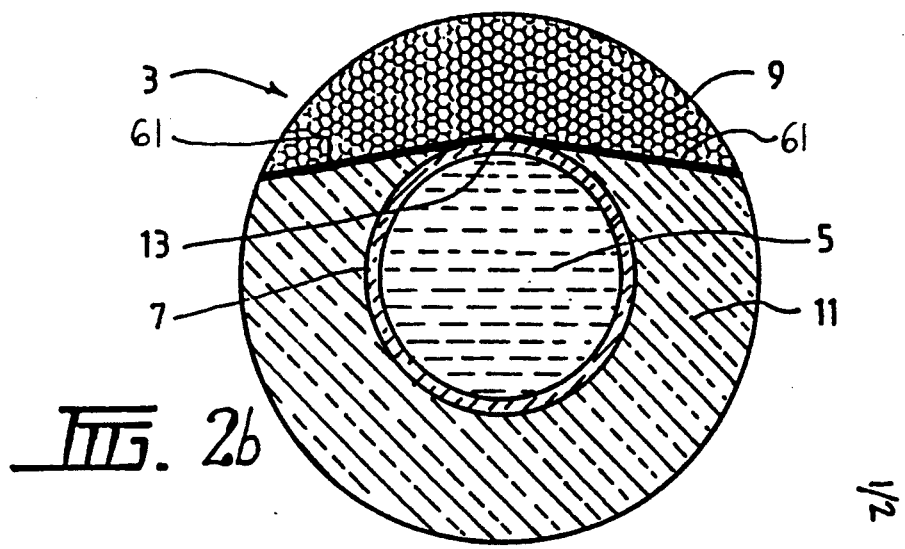

In FIG. 1 there is shown a pipe 7, a fluid 5 conveyed in the pipe 7, and a system 3, formed in accordance with a first embodiment of the invention, for heating the fluid 5 in the pipe 7. It is noted that the heating system of the invention is not limited to use in connection with pipes and that the heating system is equally applicable to other types of process equipment used in industry to convey or contain fluids, such as tanks and valves.

The heating system 3 shown in FIG. 1 comprises a layer of transparent insulation 9, in the form of plastic air cell insulating material, which covers an upper section 13 of the pipe 7 and a layer of non-transparent insulation 11, in the form of polyurethane, which covers the remainder of the pipe 7. The heating system 3 further comprises a transparent weather shield 10, of U.V. stabilised polycarbonate, which covers the outer surface of the layer of transparent insulation 9.

It can readily be appreciated that with such an arrangement the layer of transparent insulation 9 defines a "window" through which solar radiation can pass to impinge on the exposed upper section 13 of the pipe 7 thereby to heat the fluid 5 in the pipe 7. It can also readily be appreciated that the surface area of the "window" is substantially larger than that of the exposed upper section 13 of the pipe 7, and thus the layer of transparent insulation 9 acts as a form, albeit crude, of a thermal concentrator/diode, and the amount of energy received by the exposed upper section 13 of the pipe 7 will be greater than that received had there been no layer of transparent insulation 9.

The size ,of the "window" can be varied depending on a number of factors which include, the nature of the fluid to be heated, the size of the pipe 7, the required temperature for the fluid 5, the temperature conditions in the environment in which the pipe 7 is located (including the seasonal variation of the temperature conditions), and the type and thickness of the layer of non-transparent insulation 11.

With regard to the last of the foregoing factors, it is noted that, whilst, in the first embodiment of the heating system described with reference to FIG. 1, the layer of non-transparent insulation 11 is formed from polyurethane, any suitable insulation material could be used and the layer could be of any suitable thickness. It is also noted that the principal function of the layer of non-transparent insulation 11 is to minimize the heat loss from the fluid, particularly at night. It can readily be appreciated that, in some instances, where there is a low level of solar radiation and/or a necessity to heat the fluid in the pipe 7 to relatively high temperatures, the non-transparent insulation 11 may be replaced altogether with transparent insulation 9. In this regard, it is also noted that the transparent insulation 9 will limit the heat loss from the pipe 7, and thus in certain circumstances where the heat loss through the night is not a critical factor such an arrangement may be acceptable.

In FIG. 2a there is shown a second embodiment of a heating system of the invention. As with the first embodiment, the second embodiment is positioned to encase a pipe for conveying fluid. In the circumstances, the same reference numerals are used in FIGS. 1 and 2a to denote the same features.

The main difference between the two embodiments is that the thermal concentrator/diode of the heating system in the second embodiment is more elaborate than that of the first embodiment and includes means in addition to the "window" of transparent insulation for increasing/optimising the energy input to the fluid and minimising the heat loss from the fluid.

In one form the thermal concentrator/diode further comprises an air gap formed at the interface 15 between the polyurethane and the air cell insulation material used in the first and second embodiments to form the non-transparent insulation 11 and the transparent insulation 9, respectively. When such an air gap is arranged to incline downwardly from the exposed upper section 13 of the pipe 7 the air entrapped in the air gap is heated by thermal energy transferred by radiation, conduction and convection through the transparent "window" and circulates so as to transfer the thermal energy to the exposed upper section 13 of the pipe 7. It can readily be appreciated that such an arrangement optimises the transfer of energy incident on the transparent "window" to the fluid. In addition, the energy transfer is substantially irreversible in the sense that during the night the downward incline of the air gap with respect to the exposed section 13 of the pipe 7 minimises the loss of heat by reverse circulation.

A more sophisticated form of a thermal concentrator/diode as shown in FIG. 2b, which also is substantially irreversible, comprises a partially evacuated stainless steel or the like plate 61 which encloses a volume of water or other fluid. The plate 61 is arranged to incline downwardly from the exposed section 13 of the pipe 7.

In use, thermal energy transferred through the transparent "window" evaporates the water in the lower section of the plate 61 and the vapour circulates upwardly and inwardly to the exposed section 13 of pipe 7. The vapour condenses at the upper section of the pipe, thereby transferring thermal energy to the pipe 7, and flows down the plate 61 to the lower section to be evaporated again.

Figure 2C:
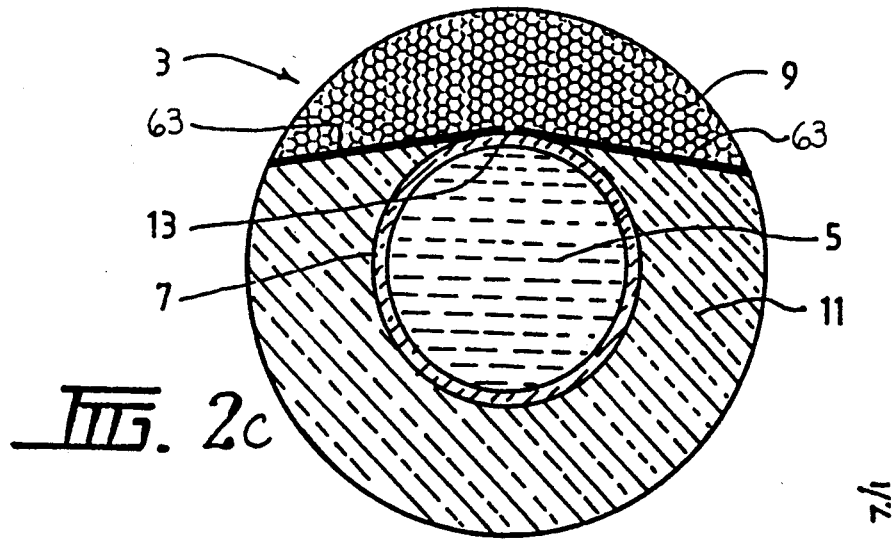

In an alternative arrangement as shown in FIG. 2c, the thermal concentrator/diode further comprises a plate 63 formed from polycarbonate or the like material with passages extending therethrough. The plate 63 is arranged to extend outwardly and downwardly from the exposed surface 13 of the pipe 7 and to terminate short of the exposed outer surfaces of the transparent insulation 9 and the non-transparent insulation 11. In use, the air in the plate 63 is heated by thermal energy transferred through the transparent "window" and circulates so as to transfer thermal energy to the exposed upper section 13 of the pipe 7. Again, the heat transfer is substantially irreversible.

The above arrangements are three examples only of means which allow energy to be transferred selectively inwardly to the exposed section of the process equipment and which minimise transfer of energy outwardly to the exposed surfaces of the transparent and non-transparent insulations.

The effectiveness of the heating system of the invention is reflected in FIG. 3 by the variation of the temperature of fluid in pipes enclosed by transparent insulation and non-transparent insulation in accordance with the first and second embodiments shown in FIGS. 1 and 2 over a period of approximately four days, under steady state conditions. The plot marked A relates to fluid in a pipe enclosed by the first embodiment shown in FIG. 1, and the plot marked B relates to fluid in a pipe enclosed by the second embodiment shown in FIG. 2. The third plot C is the ambient temperature over the four day period. It is evident from FIG. 3 that both embodiments of the heating system of the invention are capable of maintaining the temperature of the fluid significantly above the ambient conditions. It is noted that the fluid in both pipes was heated solely by solar radiation and there was no additional heating. In addition, it is noted that the fluid in both pipes reached temperatures in excess of the temperatures typically required in industry.

In the embodiments shown in FIGS. 1 and 2, the basic form of thermal concentrator/diode comprises a "window" of transparent insulation,. The "window" is a convenient means by which solar radiation can be used to heat the fluid in the process equipment. However, it is also a means by which heat can be lost from the fluid overnight or at times of low external temperature, when compared with the best non-transparent insulation. In many instances, in order to maintain the required situation in which the net heat in is greater than the net heat out it is important to supplement the energy input to the fluid, such by the means disclosed in the second embodiment shown in FIG. 2.

Notwithstanding the above, the present invention does not depend solely on the use of a "window" of transparent insulation as the basic component of the thermal concentrator/diode, with or without supplementary energy input, and extends to arrangements which do not include a "window" of transparent insulation.

Such an arrangement is shown in FIGS. 4 and 5. With reference to these figures, there is shown a pipe 25 containing or conveying a fluid 27. The pipe 25 is clad in a generally conventional manner with a layer of non-transparent thermal insulation 29 (typically polyurethane) and an outer sheath of aluminium 31.

The arrangement further comprises a thermal concentrator/diode for heating the fluid 27. The thermal concentrator/diode comprises a loop 33 of tubular material which is at least partly evacuated and contains a small volume of water., The loop 33 is located in the layer of non-transparent thermal insulation 29 with one longer section 35 in heat transfer relationship with the pipe 33 and the other longer section 37 in heat transfer relationship with the aluminium sheath 31. In addition, the loop 33 is angled so that the longer section 35 is higher than the longer section 37, with the result that in non-heating situations the water is located in the lower longer section 37.

It can readily be appreciated that, in use, when exposed to solar radiation, the aluminium sheath 31 will heat up and the water will evaporate, the vapour will rise and move into the upper longer section 35 of the loop and condense, with the energy released heating the fluid 27 in the pipe 25. The arrangement is generally irreversible since the loop 33 is angled and thus there will be minimal heat loss from the fluid 27 by means of the thermal concentrator/diode.

The efficiency of the system can be improved by increasing the thickness of the aluminium sheath 31 in the region of the lower longer section 37 of the loop 33 to optimise heat to the loop 33, providing an air bubble with a transparent layer of polycarbonate 39 in the region of the loop 33 to minimise heat loss from the section of the aluminium sheath 31 in the region of the loop 33, by forming the shorter sections 41 of the loop 33 from materials of low thermal conductivity, such as glass, to minimise heat loss from the shorter sections 41, and by forming the longer sections 35, 37 from materials of high thermal conductivity, such as copper, to optimise heat transfer.

The thermal concentrator/diode shown in FIGS. 4 and 5 is adapted to be formed as a separate unit which can be used in connection with conventionally clad pipes or other process equipment. In this regard, it can readily be appreciated that the principal feature of this embodiment of the thermal concentrator/diode is that it makes use of existing components of the process equipment and combines them together in such a way as to efficiently heat the fluid conveyed or contained in the process equipment and does not involve the use of expensive, cumbersome, and maintenance intensive external heating (and insulation).

Many modifications to the embodiments described in relation to FIGS. 1 and 2 may be made without departing from the spirit and scope of the invention.

I claim:

1. A system for heating a fluid conveyed or contained in process equipment and for minimising heat loss to maintain the temperature of the fluid at or above a minimum operating temperature of the fluid during periods of non-solar radiation, the system comprising:
    transparent thermal insulation covering a section of the process equipment to expose the section to solar radiation, and non-transparent thermal insulation covering the remainder of the process equipment to minimise heat loss from the fluid; the interface between the transparent and non-transparent insulation being inclined downwardly from the exposed section of the process equipment;
    the transparent insulation defining a part of a thermal concentrator/diode for transferring energy from solar radiation to the fluid thereby to heat the fluid and for minimising heat loss from the fluid;
    the thermal concentrator/diode further comprising means located in the interface between the transparent and non-transparent insulation for absorbing energy from solar radiation and for transferring the energy inwardly along a path to the exposed section of the process equipment and for minimising transfer of energy outwardly along the path from the exposed section of the process equipment during periods of non-solar radiation.

2. The system defined in claim 1, wherein the transparent thermal insulation comprises plastic air cell insulating material.

3. The system defined in claim 1, further comprises a transparent weather shield over the exposed outer surface of the transparent thermal insulation.

4. The system defined in claim 3, wherein the weather shield comprises U.V. stabilised polycarbonate.

5. The system defined in claim 3, wherein the non-transparent thermal insulation comprises polyurethane.

6. The system defined in claim 3, wherein the interface between the transparent and non-transparent insulation is inclined downwardly from the exposed section of the process equipment.

7. The system defined in claim 1, wherein the non-transparent thermal insulation comprises polyurethane.

8. The system defined in claim 1, wherein the interface system comprises a continuous air gap at the interface between the transparent and non-transparent thermal insulation.

9. The system defined in claim 1, wherein the interface system comprises a partially evacuated stainless steel hollow plate containing volume of a heat transfer fluid extending outwardly along the interface from the exposed section of the process equipment.

10. The system defined in claim 1, wherein the interface system comprises a plate having air passages therein, the plate extending outwardly along the interface from the exposed surface of the process equipment but terminating short of the outer surfaces of the transparent and non-transparent thermal insulation.

11. The system defined in claim 1, wherein the process equipment is a pipeline.

12. Process equipment for conveying or containing a fluid comprising a system for heating the fluid defined in claim 1.

13. The system defined in claim 1, further comprises a transparent weather shield over the exposed outer surface of the transparent thermal insulation.

14. The system defined in claim 13, wherein the weather shield comprises U.V. established polycarbonate.

15. The system defined in claim 1, wherein the non-transparent thermal insulation comprises polyurethane.

16. The system defined in claim 1, wherein the interface between the transparent and non-transparent insulation is inclined downwardly from the exposed section of the process equipment.

17. A thermal concentrator/diode for heating a fluid conveyed in a pipeline covered by an outer layer of insulation and for minimising heat loss to maintain the temperature of the fluid at or above a minimum operating temperature during periods of non-solar radiation, said thermal concentrator/diode comprising a tube containing a heat transfer fluid, the tube comprising a first part adapted for location at or near the surface of the outer layer of insulation for absorbing energy from solar radiation to vaporize the heat transfer fluid and a second part coupled to the first part and adapted for location in heat transfer relationship with the pipeline to condense the vaporized heat transfer fluid and thereby transfer the energy to the fluid, and said thermal concentrator/diode being adapted to prevent heat loss from the pipeline during periods of non-solar radiation.

18. A system for heating a fluid conveyed or contained in process equipment and for minimising heat loss to maintain the temperature of the fluid at or above a minimum operating temperature for the fluid during periods of non-solar radiation, the system comprising:
 (a) non-transparent thermal insulation at least substantially covering the process equipment to minimise heat loss from the fluid; and
 (b) a thermal concentrator/diode in heat transfer relationship with the fluid transferring energy from solar radiation to the fluid thereby to heat the fluid and for minimising heat loss from the fluid, the thermal concentrator/diode comprising a first part of absorbing energy from solar radiation and a second part in heat transfer relationship with the process equipment for transferring the energy to the fluid.

19. The system defined in claim 18, wherein the thermal concentrator/diode comprises a circuit containing a heat transfer fluid, with the first part and the second part being parts of the circuit, and the second part being positioned higher than the first part.

20. The system defined in claim 19, wherein the process equipment is a pipeline.

21. The system defined in claim 18, wherein the process equipment is a pipeline.

22. Process equipment for conveying or containing a fluid comprising a system for heating the fluid defined in claim 18.

* * * * *

UNITED STATES PATENT AND TRADEMARK OFFICE
CERTIFICATE OF CORRECTION

PATENT NO. : 5,261,390
DATED : November 16, 1993
INVENTOR(S) : JOHN B. LASICH

It is certified that error appears in the above-identified patent and that said Letters Patent is hereby corrected as shown below:

```
In column 1, line 28, delete "SUMMARY OF THE INVENTION".
In column 1, after line 30 insert
     --SUMMARY OF THE INVENTION--.
In column 2, line 15, for "cuter" read --outer--.
In column 6, line 38, after "containing" insert --a--.
In column 6, line 56, for "established" read --stabilized--.
```

Signed and Sealed this

Thirty-first Day of May, 1994

Attest:

BRUCE LEHMAN

Attesting Officer    Commissioner of Patents and Trademarks